United States Patent Office 3,595,911
Patented July 27, 1971

3,595,911
PRODUCTION OF UNSATURATED CARBOXYLIC ACIDS
William John Ball, Capel, near Dorking, England, assignor to The Distillers Company Limited, Edinburgh, Scotland
No Drawing. Filed Feb. 2, 1967, Ser. No. 613,410
Claims priority, application Great Britain, Feb. 26, 1966, 8,571/66
Int. Cl. C07c 57/04
U.S. Cl. 260—533N                                  12 Claims

ABSTRACT OF THE DISCLOSURE

The application relates to the production of acrylic or methacrylic acid by the vapour phase catalytic oxidation of the corresponding unsaturated aldehydes or olefines wherein the oxidation catalyst is an oxide composition containing antimony and molybdenum together with one or more specified polyvalent metals.

---

The present invention relates to the production of unsaturated aliphatic carboxylic acids and in particular to the production of acrylic and methacrylic acid.

Processes for the production of unsaturated aliphatic aldehydes by the vapour phase catalytic oxidation of mono-olefines are known. Thus British specification 864,666 describes and claims a process for the production of acrolein or methacrolein which comprises reacting at an elevated temperature in the vapour phase propylene or isobutene with oxygen in the presence of an oxidation catalyst comprising antimony oxide and preferably comprising antimony oxide in combination with another polyvalent metal oxide e.g. an oxide of molybdenum, tungsten, tellurium, copper, titanium, cobalt or tin. Similarly, British specification 991,085 describes and claims a process for the production of acrolein or methacrolein by the vapour phase catalytic oxidation of propylene or isobutene employing an oxidation catalyst comprising antimony oxide in combination or admixture with an oxide of vanadium, chromium, manganese, iron, nickel, zinc, gallium, germanium, selenium, niobium, yttrium, rubidium, ruthenium, rhodium, palladium, indium, osmium, iridium, and/or uranium.

It has now been found that the addition of molybdenum to certain of the above compositions containing antimony and at least one other metal provides an oxidation catalyst suitable for use in catalysing the conversion of olefines or unsaturated aldehydes to the corresponding unsaturated acids in the presence of molecular oxygen.

Accordingly the present invention is a process for the production of acrylic or methacrylic acid which comprises reacting at an elevated temperature in the vapour phase acrolein or methacrolein or substances which under the reaction conditions give rise to acrolein or methacrolein with molecular oxygen over an oxide composition containing antimony and molybdenum together with one or more of the polyvalent metals tungsten, tellurium, bismuth, cadmium, copper, titanium, tin, chromium, manganese, iron, thorium, thallium, nickel, zinc, germanium, cerium and uranium as catalyst.

The oxide composition must contain antimony and molybdenum and at least one of the other polyvalent metals specified. Preferred compositions contain more than 50 atom percent and preferably between 50 and 75 atoms percent of antimony, less than 30 atoms percent and preferably between 1 and 30 atoms percent of molybdenum and less than 40 atom percent and preferably between 15 and 40 atoms percent of the other polyvalent metals specified, based on the total metals of the composition. Preferred compositions contain, in addition to antimony and molybdenum, one or more of the following: zinc, iron, nickel, chromium, titanium, manganese or copper.

The oxide composition catalysts may be regarded either as mixtures of metal oxides or as oxygen-containing compounds of the metals; under the reaction conditions the catalyst may contain either or both forms.

The catalyst may be prepared in various ways, for instance, by precipitation from an aqueous solution containing a mixture of the soluble salts of the metals by the addition of, for example, ammonia or from the oxides, carbonates, hydroxides or hydrated oxides by suitable admixture followed if necessary by thermal decomposition of compounds such as carbonates, hydroxides or hydrated oxides to produce the corresponding oxides in situ.

By whichever method the catalyst is prepared it is preferred to subject it to a heat treatment. Optionally this heat treatment may be carried out by heating the composition prior to the addition of the molybdenum component in a molecular oxygen containing gas e.g. air at temperatures in the range 600–950° C., thereafter adding the molybdenum component and heating the final composition in a molecular oxygen containing gas e.g. air at a temperature in the range 600–900° C.

The oxide composition catalysts may if desired be deposited upon supports such as alumina, pumice or silica.

The reaction of acrolein or methacrolein, with molecular oxygen over the oxide composition catalysts may be carried out in any suitable manner, for instance as a fixed bed process in which the catalyst is used in the form of granules or pellets, or a single or multistage fluidised bed process, or as a moving bed process.

The proportion of acrolein or methacrolein in the feed to the reaction may vary within fairly wide limits, for example between 1 and 20% of the feed, and suitably between 2 and 10% by volume.

The concentration of oxygen in the feed may also vary within moderately wide limits for example between 1 and 20% by volume and preferably between 2 and 15% by volume. The oxygen may be diluted with inert gases and may be for example supplied as air.

It is preferred to carry out the reaction in the presence of a gas which is substantially inert under the conditions of reaction for example nitrogen, propane, butane, isobutane, carbon dioxide and/or steam. It is preferred to use steam or nitrogen or mixtures thereof. The concentration of the steam may vary within wide limits for example between 10 and 60% by volume of the feed.

The reaction is carried out at an elevated temperature, for instance between 250 and 550° C. and preferably between 300 and 500° C. The reaction may also be carried out under pressure for example pressures of from 0.5 to 5 atmospheres absolute. The contact time may be for example in the range ½ to 30 seconds and preferably between 1 and 5 seconds.

The acrylic or methacrylic acid may be recovered from the reaction product by any conventional method, for example, by condensation or extraction with water.

The process of the invention is further illustrated by the following examples.

EXAMPLE 1

Antimony:titanium:molybdenum (4:1:0.5) catalyst

Titanium tetrachloride (47.4 parts by weight) followed by water (1000 parts by weight) was added slowly to antimony pentachloride (299 parts by weight). The mixture was brought to pH 7 by the addition of aqueous ammonia, filtered and the filter-cake washed three times by resuspension in water (1000 parts by weight) and filtered.

The moist filter-cake was mixed with a solution of ammonium molybdate, $(NH_4)_6Mo_7O_{24}, 4H_2O$ (22.2 parts by weight) in water (200 parts by weight), evaporated to a thick paste on a steam-bath and dried for 16 hours at 110° C. The dried cake was broken down to pass 30 mesh (B.S.S.), mixed with graphite (1% by weight) and heated in air in a muffle furnace. The furnace temperature was programmed from 200° C. to 700° C. at 21° C./hour and maintained at 700° C. for 16 hours.

A gaseous mixture of (by volume) 7% acrolein, 5% oxygen, 58% nitrogen and 30% steam was passed over the catalyst in a reactor maintained at 380° C., the contact time being 3 seconds.

Of the total acrolein fed to the reactor, 57% was converted to acrylic acid, 9% to carbon oxides and 28% was recovered unchanged.

EXAMPLE 2

Antimony:manganese:molybdenum (4:1:0.5) catalyst

Antimony pentachloride (299.0 parts by weight) was added slowly to a stirred solution of manganese chloride, $MnCl_2, 4H_2O$ (49.4 parts by weight) in water (1000 parts by weight). The mixture was brought to pH 9 by the addition of aqueous ammonia, filtered and the filter-cake washed three times by resuspension in water (1000 parts by weight) and filtered. The moist filter-cake was mixed with a solution of ammonium molybdate $$(NH_4)_6Mo_7O_{24}4H_2O$$

(22.2 parts by weight) in water (200 parts by weight), evaporated to a thick paste on a steam-bath and dried for 16 hours at 110° C. The dried cake was broken down to pass 30 mesh (B.S.S.), mixed with graphite (1% by weight) and heated in air in a muffle furnace. The furnace temperature was programmed from 200° C. to 700° C. at 21° C./hour and maintained at 700° C. for 16 hours.

A gaseous mixture of (by volume) 7% acrolein, 5% oxygen, 58% nitrogen and 30% steam was passed over the catalyst in a reactor maintained at 410° C., the contact time being 3 seconds.

Of the total acrolein fed to the reactor, 34% was converted to acrylic acid, 10% to carbon oxides and 48% was recovered unchanged.

EXAMPLE 3

Antimony:copper:molybdenum (4:1:0.5) catalyst

Antimony pentachloride (299.0 parts by weight) was added slowly to a stirred solution of copper chloride, $CuCl_2 2H_2O$ (42.6 parts by weight) in water (1000 parts by weight). The mixture was brought to pH 6.5 by the addition of aqueous ammonia, filtered and the filter-cake washed three times by resuspension in water (1000 parts by weight) and filtered. The moist filter-cake was mixed with a solution of ammonium molybdate $$(NH_4)_6Mo_7O_{24}4H_2O$$

(22.2 parts by weight) in water (200 parts by weight), evaporated to a thick paste on a steam bath and dried for 16 hours at 110° C. The dried cake was broken down to pass 30 mesh (B.S.S.), mixed with graphite (1% by weight) and heated in air in a muffle furnace. The furnace temperature was programmed from 200° C. to 700° C. at 21° C./hour and maintained at 700° C. for 16 hours.

A gaseous mixture of (by volume) 7% acrolein, 5% oxygen, 58% nitrogen and 30% steam was passed over the catalyst in a reactor maintained at 381° C., the contact time being 3 seconds.

Of the total acrolein fed to the reactor, 44% was converted to acrylic acid, 8% to carbon oxides and 41% was recovered unchanged.

EXAMPLE 4

Antimony:nickel:molybdenum catalyst

Antimony pentachloride (299.0 parts by weight) was added slowly to a stirred solution of nickel chloride hexahydrate (237.7 parts by weight) in water (1000 parts by weight). The mixture was brought to pH 6.5 by the addition of aqueous ammonia, filtered and the filter-cake washed three times by resuspension in water (1000 parts by weight) and filtered. The moist filter-cake was mixed with a solution of ammonium molybdate $$(NH_4)_6Mo_7O_{24}4H_2O$$

(22.2 parts by weight) in water (200 parts by weight), evaporated to a thick paste on a steam-bath and dried for 16 hours at 110° C. The dried cake was broken down to pass 30 mesh (B.S.S.), mixed with graphite (1% by weight) and heated in air in a muffle furnace. The furnace temperature was programmed from 200° C. to 700° C. at 21° C./hour and maintained at 700° C. for 16 hours.

A gaseous mixture of (by volume) 7% acrolein, 5% oxygen, 58% nitrogen and 30% steam was passed over the catalyst in a reactor maintained at 352° C., the contact time being 3 seconds.

Of the total acrolein fed to the reactor, 69% was converted to acrylic acid, 8% to carbon oxides and 14% was recovered unchanged.

EXAMPLE 5

Antimony:zinc:molybdenum (4:1:1) catalyst

Antimony pentachloride, $SbCl_5$ (128 parts by weight), was added slowly to a solution of zinc chloride, previously made by dissolving granulated zinc (16.4 parts by weight) in concentrated hydrochloric acid (177 parts by weight). The mixture was then neutralised to pH 7.0 at 60° C. by the addition of aqueous ammonia. It was then cooled to 40° C., filtered and the solid washed three times by resuspension for 15 mins. in water (500 parts by weight) each time, and filtered. The filter cake was mixed with a solution of ammonium molybdate, $$(NH_4)_6Mo_7O_{24}4H_2O$$

(44.2 parts by weight) in water (300 parts by weight), evaporated to a thick paste on a steam bath and dried at 110° C. for 16 hrs. The cake was broken down to pass 30 mesh (B.S.S.), mixed with graphite (1% by weight), pelleted and heated in air in a muffle furnace. The furnace temperature was programmed from 200° C. to 700° C. at 22° C./hr. and maintained at 700° C. for 16 hours.

A gaseous mixture of (by volume), 7.0% acrolein, 53.0% nitrogen, 10% oxygen, 30% steam was passed over the catalyst maintained in a reactor at 399° C., the contact time being 3 seconds.

Of the total acrolein fed to the reactor, 61% was converted to acrylic acid, 13% to carbon oxides and 19% was recovered unchanged.

EXAMPLE 6

Antimony:chromium:molybdenum (4:1:0.5) catalyst

Antimony pentachloride (598 parts by weight) was added slowly to a solution of chromic trichloride hexahydrate, $Cr.Cl_3.6H_2O$ (133.3 parts by weight) in water (250 parts by weight). The mixture was then neutralised to pH 6.5 by the addition of aqueous ammonia. Throughout this neutralisation the temperature was maintained at ≤60° C. The mixture was then cooled to 40° C., filtered and the solid washed three times by resuspension for 15 minutes in water (1,500 parts by weight) each time, and filtered. The filter cake was mixed with a solution of ammonium molybdate, $(NH_4)_6Mo_7O_{24}4H_2O$ (44.1 parts by weight) in water (400 parts by weight), evaporated to a thick paste on a steam bath and dried at 110° C. for 16 hrs. The cake was broken down to pass 30 mesh (B.S.S.), mixed with graphite (1% by weight), pelleted and heated in air in a muffle furnace. The furnace temperature was programmed from 200° C. to 800° C. at 22° C./hr. and maintained at 800° C. for 16 hours.

A gaseous mixture of (by volume), 7.0% acrolein, 53.0% nitrogen, 10% oxygen, 30% steam was passed over the catalyst in a reactor maintained at 350° C., the contact time being 3 seconds.

Of the total acrolein fed to the reactor 62% was converted to acrylic acid, 18% to carbon oxides and 11% was recovered unchanged.

EXAMPLE 7

Antimony:tin:nickel:molybdenum (4:1:0.5:0.5) catalyst

Powdered tin (79.1 parts by weight) was added slowly during 30 minutes to a stirred suspension of commercial antimony trioxide (388.5 parts by weight) in a mixture of concentrated 70% nitric acid (497 parts by weight) and water (1,300 parts by weight) at 95–100° C.; the mixture was stirred for 10 minutes, cooled to 40° C. and filtered. The filter cake was suspended in a solution of nickel nitrate hexahydrate, $Ni(NO_3)_2 \cdot 6H_2O$ (96.9 parts by weight), in water (200 parts by weight) at 60° C. and the mixture neutralised to pH 6.5 by the addition of aqueous ammonia. The mixture was filtered and the solid washed once by resuspension for 15 minutes in water (1,500 parts by weight), and filtered. The filter cake was mixed with a solution of ammonium molybdate, $$(NH_4)_6Mo_7O_{24} \cdot 4H_2O$$

(58.8 parts by weight) in water (300 parts by weight), evaporated to a thick paste on a steam bath and dried at 110° C. for 16 hrs. The cake was broken down to pass 30 mesh (B.S.S.), mixed with graphite (1% by weight), pelleted and heated in air in a muffle furnace. The furnace temperature was programmed from 200° C. to 700° C. at 22° C./hr. and maintained at 700° C. for 16 hrs.

A gaseous mixture of (by volume), 7.0% acrolein, 53.0% nitrogen, 10% oxygen, 30% steam was passed over the catalyst in a reactor maintained at 399° C., the contact time being 3 seconds.

Of the total acrolein fed to the reactor, 48% was converted to acrylic acid, 17% to carbon oxides and 27% was recovered unchanged.

EXAMPLE 8

Antimony:iron:molybdenum (4:1:0.5) catalyst

Antimony pentachloride, $SbCl_5$ (598 parts by weight), was added slowly to a solution of ferric chloride $FeCl_3$ (81.1 parts by weight), in water (125 parts by weight). The mixture was then neutralised to pH 7.0 by the addition of aqueous ammonia. Throughout this neutralisation the temperature did not exceed 60° C. The mixture was then cooled to 40° C., filtered, and the solid washed three times by resuspension in water (1,400 parts by weight) for 15 minutes each time, and filtered. The filter cake was mixed with a solution of ammonium molybdate $$(NH_4)_6Mo_7O_{24} \cdot 4H_2O$$

(44.1 parts by weight), in water (400 parts by weight), evaporated to a thick paste on a steam bath, and dried at 110° C. for 16 hours. The cake was broken down to pass 30 mesh (B.S.S.), mixed with graphite (1% by weight), pelleted and heated in air in a muffle furnace. The furnace temperature was programmed from 200° C. to 700° C. at 22° C./hr. and maintained at 700° C. for 16 hours.

A gaseous mixture of (by volume), 7.0% acrolein, 53.0% nitrogen, 10% oxygen, 30% steam was passed over the catalyst in a reactor maintained at 351° C., the contact time being 3 seconds.

Of the total acrolein fed to the reactor, 60% was converted to acrylic acid, 13% to carbon oxides and 20% was recovered unchanged.

EXAMPLE 9

Antimony:tin:copper:molybdenum (4:1:0.25:0.5) catalyst

Powdered tin (118.7 parts by weight) was added slowly during 30 minutes to a stirred suspension of commercial antimony trioxide (583.2 parts by weight) in a mixture of concentrated 70% nitric acid (710 parts by weight) and water (2,000 parts by weight) at 95–100° C.; the mixture was stirred for 10 minutes, cooled to 40° C. and filtered. The filter cake was suspended in a solution of cupric nitrate trihydrate, $Cu(NO_3)_2 \cdot 3H_2O$ (60.4 parts by weight) in water (250 parts by weight) at 60° C. and the mixture neutralised to pH 7.0 by the addition of aqueous ammonia. The mixture was then cooled to 40° C., filtered and the solid washed once by resuspension for 15 minutes in water (2,000 parts by weight), and filtered. The washed solid was then dried in the oven at 110° C. for 16 hrs., broken down to pass 30 mesh, mixed with 1% (by weight) of graphite and pelleted. The pellets were then heated in air in a muffle furnace. The furnace temperature was programmed from 200° C. to 900° C. at 22° C./hour, and maintained at 900° C. for 16 hours. The heated pellets were then ground down to pass 30 mesh (B.S.S.), mixed with a solution of ammonium molybdate, $$(NH_4)_6Mo_7O_{24} \cdot 4H_2O$$

(88 parts by weight) in water (800 parts by weight), evaporated to a thick paste on a steam bath and dried at 110° C. for 16 hours. The cake was broken down to pass 30 mesh (B.S.S.), mixed with graphite (1% by weight), pelleted and reheated in air in a muffle furnace. The furnace temperature was programmed from 200° C. to 600° C. at 22° C./hour and maintained at 600° C. for 16 hours.

A gaseous mixture of (by volume) 7.0% acrolein, 53.0% nitrogen, 10% oxygen, 30% steam was passed over the catalyst in a reactor maintained at 404° C., the contact time being 3 secs.

Of the total acrolein fed to the reactor, 42% was converted to acrylic acid, 18% to carbon oxides and 36% was recovered unchanged.

EXAMPLE 10

Antimony:tin:cobalt:molybdenum (4:1:1:0.5) catalyst

Powdered tin (59.4 parts by weight) was added slowly during 30 minutes to a stirred suspension of commercial antimony trioxide (291.6 parts by weight) in a mixture of concentrated 70% nitric acid (383 parts by weight) and water (1,000 parts by weight) at 95–100° C.; the mixture was stirred for 10 minutes, cooled to 40° C. and filtered. The filter cake was suspended in a solution of cobaltous nitrate, $Co(NO_3)_2 \cdot 6H_2O$, (145.6 parts by weight) in water (500 parts by weight) at 60° C. and the mixture neutralised to pH 8.0 by the addition of aqueous ammonia. The mixture was then cooled to 40° C., filtered and the solid washed three times by resuspension in water (600 parts by weight) for 15 minutes during each wash, and filtered. The filter cake was mixed with a solution of ammonium molybdate $(NH_4)_6Mo_7O_{24} \cdot 4H_2O$ (44.2 parts by weight) in water (400 parts by weight), evaporated to a thick paste on a steam bath and dried at 110° C. for 16 hrs. The cake was broken down to pass 30 mesh (B.S.S.), mixed with graphite (1% by weight), pelleted and heated in air in a muffle furnace. The furnace temperature was programmed from 200° C. to 700° C. at 22°/hour and maintained at 700° C. for 16 hours.

A gaseous mixture of (by volume), 7.0% acrolein, 53.0% nitrogen, 10% oxygen, 30% steam was passed over the catalyst in a reactor maintained at 381° C., the contact time being 3 seconds.

Of the total acrolein fed to the reactor 54% was converted to acrylic acid, 12% to carbon oxides and 31% was recovered unchanged.

EXAMPLE 11

Antimony:tin:manganese:molybdenum (4:1:0.5:0.5) catalyst

Powdered tin (79.2 parts by weight) was added slowly during 30 minutes to a stirred suspension of commercial antimony trioxide (388.5 parts by weight) in a mixture of concentrated 70% nitric acid (497 parts by weight) and water (1,300 parts by weight) at 95–100° C.; the mixture was stirred for 10 mins., cooled to 40° C. and filtered. The filter cake was suspended in a mixture of 50% w./w. manganese nitrate solution, $Mn(NO_3)_2 6H_2O$ (193 parts by weight), and water (500 parts by weight) at 20° C. and the mixture neutralised to pH 10.0 by the addition of aqueous ammonia. The mixture was then filtered and the solid washed three times by resuspension in water (1,500 parts by weight) for 15 minutes during each wash, and filtered. The filter cake was mixed with a solution of ammonium molybdate (58.8 parts by weight) in water (175 parts by weight), evaporated to a thick paste on a steam bath and dried at 110° C. for 16 hours. The cake was broken down to pass 30 mesh (B.S.S.), mixed with graphite (1% by weight) pelleted and heated in air in a muffle furnace. The furnace temperature was programmed from 200° C. to 700° C. at 22° C./hr. and maintained at 700° C. for 16 hours.

A gaseous mixture of (by volume), 7.0% acrolein, 53.0% nitrogen, 10% oxygen, 30% steam was passed over the catalyst in a reactor maintained at 409° C.

Of the total acrolein fed to the reactor, 38% was converted to acrylic acid, 19% to carbon oxides and 36% was recovered unchanged.

EXAMPLE 12

Antimony:tin:iron:molybdenum (4:1:0.25:0.5) catalyst

Powdered tin (118.7 parts by weight) was added during 30 minutes to a stirred suspension of commercial antimony trioxide (583 parts by weight) in a mixture of concentrated 70% nitric acid (710 parts by weight) and water (200 parts by weight) at 95–100° C.; the mixture stirred for 10 minutes, cooled to 40° C. and filtered. The filter-cake was suspended in a solution of ferric nitrate nonahydrate (101 parts by weight) in water (1800 parts by weight) at 60° C. and the mixture neutralised to pH 7 by addition of aqueous ammonia. The mixture was filtered and the solid washed once by resuspension for 15 minutes in water (2000 parts by weight), and filtered. The filter-cake was mixed with a solution of ammonium molybdate $(NH_4)_6Mo_7O_{24}, 4H_2O$ (88 parts by weight) in water (800 parts by weight) evaporated to a thick paste on a steam-bath and dried at 110° C. for 16 hours. The cake was broken down to pass 30 mesh (B.S.S.), mixed with graphite (1% by weight), pelleted and heated in air in a muffle furnace. The furnace temperature was programmed from 200° to 800° C. at 22°/hour and maintained at 800° C. for 16 hours.

A gaseous mixture of by volume 7% acrolein, 5% oxygen, 58% nitrogen and 30% steam was passed over the catalyst in a reactor maintained at 403° C., the contact time being 3 seconds.

Of the total acrolein fed to the reactor, 55% was converted to acrylic acid, 16% to carbon oxides and 21% was recovered unchanged.

EXAMPLE 13

Antimony:tin:iron:molybdenum (3:1:0.5:0.5) catalyst

Powdered tin (95 parts by weight) was added during 30 minutes to a stirred suspension of commercial antimony trioxide (350 parts by weight) in a mixture of concentrated 70% nitric acid (568 parts by weight) and water (1600 parts by weight) at 95 to 100° C.; the mixture stirred for 10 minutes cooled at 40° C. and filtered. The filter-cake was suspended in a solution of ferric nitrate nonahydrate (161.6 parts by weight) in water (1800 parts by weight) at 60° C. and the mixture neutralised to pH 7 by addition of aqueous ammonia. The mixture was filtered and the solid washed once by resuspension for 15 minutes in water (2000 parts by weight), and filtered. The filter-cake was mixed with a solution of ammonium molybdate $(NH_4)_6Mo_7O_{24}, 4H_2O$ (70.4 parts by weight) in water (700 parts by weight) evaporated to a thick paste on a steam-bath and dried at 110° C. for 16 hours. The cake was broken down to pass 30 mesh (B.S.S), mixed with graphite (1% by weight), pelleted and heated in air in a muffle furnace. The furnace temperature was programmed for 200° to 700° C. at 22°/hour and maintained at 700° for 16 hours.

A gaseous mixture of 7% by volume of acrolein, 5% by volume of oxygen, 58% by volume of nitrogen and 30% by volume of steam was passed over the catalyst in a reactor maintained at 382° C., the contact time being 3 seconds.

Of the total acrolein fed to the reactor, 58% was converted to acrylic acid, 13% to carbon oxides and 21% was recovered unchanged.

EXAMPLE 14

Antimony:tin:copper:molybdenum (4:1:0.25:0.5) catalyst

Powdered tin (118.7 parts by weight) was added slowly during 30 minutes to a stirred suspension of commercial antimony trioxide (583.2 parts by weight) in a mixture of concentrated 70% nitric acid (710 parts by weight) and water (2000 parts by weight) at 95–100° C.; the mixture was stirred for 10 minutes, cooled to 40° C. and filtered. The filter cake was suspended in a solution of cupric nitrate trihydrate (60.4 parts by weight) in water (250 parts by weight) at 60° C. and the mixture neutralised to pH 7.0 by the addition of aqueous ammonia. The mixture was filtered and the solid washed once by resuspension for 15 minutes in water (2000 parts by weight), and filtered. The filter cake was mixed with a solution of ammonium molybdate $(NH_4)_6Mo_7O_{24}, 4H_2O$ (88 parts by weight) in water (800 parts by weight), evaporated to a thick paste on a steam-bath and dried at 110° C. for 16 hours. The cake was broken down to pass 30 mesh (B.S.S.), mixed with graphite (1% by weight), pelleted and heated in air in a muffle furnace. The furnace temperature was programmed from 200° C. to 800° C. at 22° C./hour and maintained at 800° C. for 16 hours.

A gaseous mixture of (by volume) 7.0% acrolein, 38.3% nitrogen, 24.9% air, 29.8% steam was passed over the catalyst in a reactor maintained at 407° C., the contact time being 3 seconds.

Of the total acrolein fed to the reactor, 35% was converted to acrylic acid, 12% to carbon oxides and 44% was recovered unchanged.

I claim:

1. A process for the production of an unsaturated carboxylic acid selected from acrylic or methacrylic acid which comprises reacting for a contact time of about ½ to 30 seconds at a pressure of from 0.5 to 5 atmospheres and at an elevated temperature of from about 250°–550° C., in the vapor phase acrolein or a substance giving rise to acrolein under the reaction conditions to produce acrylic acid, and methacrolein or a substance which gives rise to methacrolein under the reaction conditions to produce methacrylic acid, with molecular oxygen over an oxide composition catalyst consisting essentially of oxygen, antimony, molybdenum, together with copper, titanium, chromium, manganese, iron, nickel, or zinc, and wherein said antimony is present in more than 50 atom percent based on the total metals of the composition.

2. A process as claimed in claim 1 wherein the oxide composition contains more than 50 atom percent of antimony, less than 30 atom percent of molybdenum and less than 40 atom percent of the other polyvalent metals based on the total metals of the composition.

3. A process as claimed in claim 2 wherein the oxide composition contains between 50 and 75 atom percent of antimony, between 1 and 30 atom percent of molybdenum and between 15 and 40 atom percent of the other polyvalent metals.

4. A process as claimed in claim 1 wherein the oxide composition is prepared by precipitation from an aqueous solution containing a mixture of the soluble salts of the metals.

5. A process as claimed in claim 4 wherein precipitation is effected by addition of ammonia to the aqueous solution.

6. A process as claimed in claim 1 wherein the oxide composition is prepared by admixture of the oxides.

7. A process as claimed in claim 6 wherein the metal oxides are produced in situ by admixture of substances selected from carbonates, hydroxides or hydrated oxides of the metals.

8. A process as claimed in claim 1 wherein the oxide composition is produced by forming a composition containing all the components except molybdenum, heating the composition in a molecular oxygen containing gas at temperatures in the range 600 to 950° C., adding the molybdenum component and heating the composition in a molecular oxygen containing gas at a temperature in the range 600 to 900° C.

9. A process as claimed in claim 1 wherein the oxide composition is deposited upon a support.

10. A process as claimed in claim 9 wherein the support is selected from alumina, pumice or silica.

11. A process as claimed in claim 1 wherein propylene is the substance giving rise to acrolein and isobutene the substance giving rise to methacrolein under the reaction conditions.

12. A process for the production of an unsaturated carboxylic acid selected from acrylic or methacrylic acid which comprises reacting for a contact time of about ½ to 30 seconds at a pressure of from 0.5 to 5 atmospheres and at an elevated temperature of from about 250°–550° C., in the vapor phase acrolein or a substance giving rise to acrolein under the reaction conditions to produce acrylic acid, and methacrolein or a substance which gives rise to methacrolein under the reaction conditions to produce methacrylic acid, with molecular oxygen over an oxide composition catalyst consisting essentially of oxygen, antimony, molybdenum, tin, together with copper, manganese, iron, or nickel, and wherein said antimony is more than 50 atom percent based on the total metals of the composition.

References Cited
UNITED STATES PATENTS

| | | | |
|---|---|---|---|
| 3,408,400 | 10/1968 | Bohemen et al. | 260—533u |
| 3,405,172 | 10/1968 | Brown et al. | 260—533u |
| 3,529,652 | 7/1966 | Sachtler et al. | 260—530u |

FOREIGN PATENTS

| | | | |
|---|---|---|---|
| 999,836 | 7/1965 | Great Britain | 260—530u |
| 903,034 | 8/1962 | Great Britain | 260—530u |

JAMES A. PATTEN, Primary Examiner

R. D. KELLY, Assistant Examiner

U.S. Cl. X.R.

252—467, 468, 469, 470; 260—530N